Sept. 13, 1955 G. W. KING 2,717,922

TELEVISION HORIZONTAL PULSE CIRCUIT

Filed Nov. 15, 1952 2 Sheets-Sheet 1

INVENTOR.
GEORGE W. KING

BY H. L. Mackey

ATTORNEY

Sept. 13, 1955 G. W. KING 2,717,922

TELEVISION HORIZONTAL PULSE CIRCUIT

Filed Nov. 15, 1952 2 Sheets-Sheet 2

INVENTOR.
GEORGE W. KING

BY H. A. Mackey
ATTORNEY

United States Patent Office 2,717,922
Patented Sept. 13, 1955

2,717,922

TELEVISION HORIZONTAL PULSE CIRCUIT

George W. King, Pleasantville, N. Y., assignor to General Precision Laboratory Incorporated, a corporation of New York Application November 15, 1952, Serial No. 320,725

6 Claims. (Cl. 178—69.5)

Figure 1:
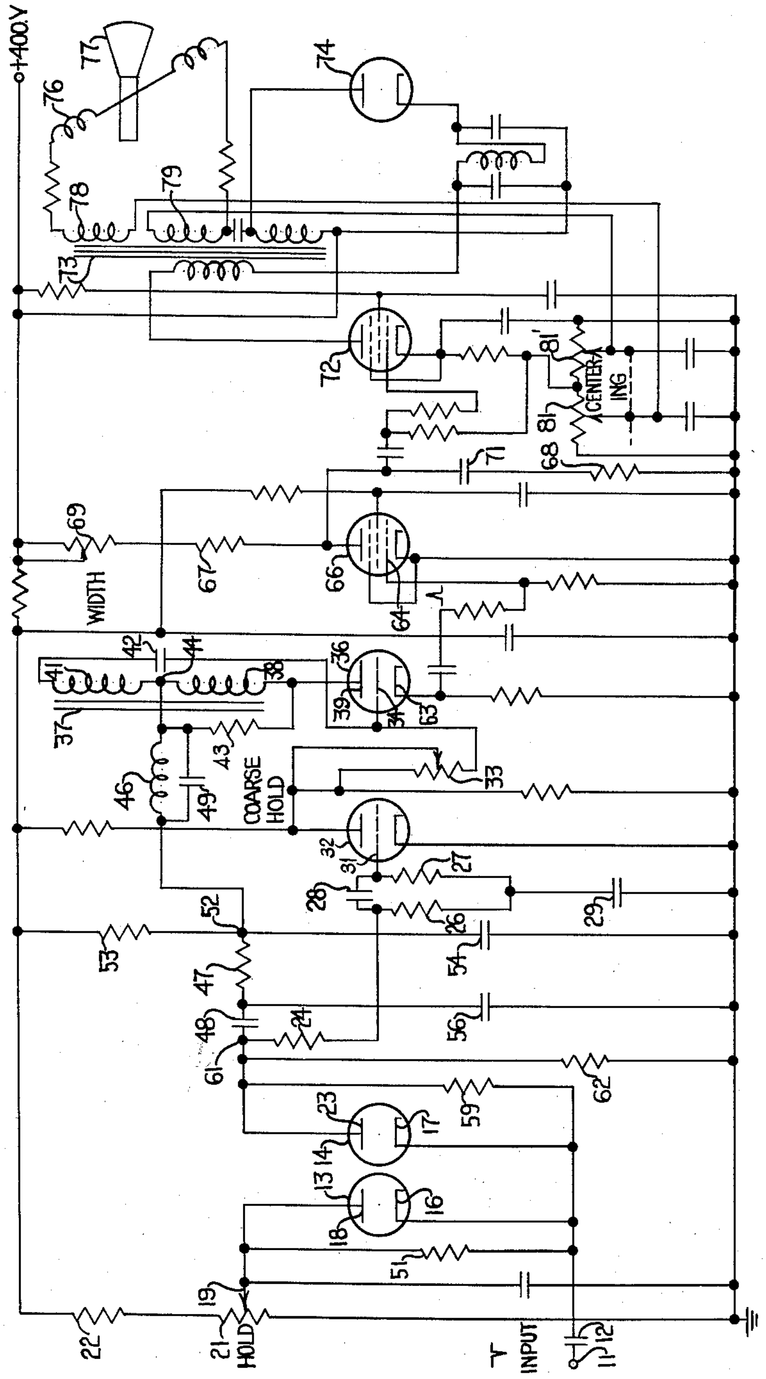

This invention relates to television circuits for regenerating horizontal synchronization pulses, and more specifically to such circuits for use in television receivers and in television monitors.

In the reception and monitoring of television signals, separation circuits are incorporated for segregating the received synchronization signals from the complete signals, and then for separating the horizontal synchronization signals from the vertical synchronization signals. However, this latter operation is usually imperfectly carried out, and the horizontal synchronization pulses must be regenerated or reshaped to a greater or less extent, usually by using some form of free-running oscillator triggered or timed by the imperfect horizontal synchronizing pulses. It is often deemed sufficient to employ relatively crude reshaping or regenerating circuits and to rely on compromise adjustments of their time constants to secure synchronism of the resulting reshaped pulses, while securing a measure of immunity from the several types of irregularity inherent in the horizontal synchronization signal and from noise disturbance.

The defects inherent in horizontal synchronizing pulses as received have two principal causes. First, the double-frequency horizontal pulses in the vertical equalizing periods are not likely to be received with the normal width and amplitude and, second, the double frequency pulses in the vertical block are likely to produce erroneous information.

The term noise is meant to include the absence of one or more horizontal pulses from any cause, and the presence of extraneous sharp pulses which to the receiver appear as additional horizontal pulses positioned intermediate the legitimate horizontal pulses. Thus the presence of noise is likely to produce misoperations similar to those produced by imperfectly separated or poorly shaped horizontal synchronization pulses.

When received horizontal synchronizing signals are not properly reshaped or regenerated and separated from noise the effect on the television picture is serious, leading to vertical curvature of the picture particularly apparent at the right and left edges of the frame. Phase distortion causes waviness of the two edges and of all intervening parts of the picture, being usually more severe at the top. If amplitude distortion is also present the waviness varies from side to side of the picture. Improper stabilization of the automatic frequency control incorporated in reshaping circuits may cause picture jitter or sporadic small horizontal jumps of the picture.

The instant invention contemplates a circuit arrangement in which the horizontal synchronizing signals are regenerated and are held to a rigid phase relationship with the received synchronizing signals, the result being to provide a train of perfect signals which in turn act through suitable deflection circuits to produce a picture free of horizontal distortional displacements.

In general the invention employs a blocking oscillator to trigger a separate sweep generator producing the spiked trapezoidal wave form required by the horizontal yoke deflection circuit of the picture tube. A double diode phase comparator is employed to compare the received horizontal synchronization signals with the oscillator output, producing a direct-current output signal representative of the instantaneous phase error. This direct current signal is employed to control the frequency of the oscillator. This circuit is noteworthy for the use of an anti-hunt network which permits free passage of both low and high frequency signals. Because of free passage of the very high frequency signals the circuit of the invention is very fast in correcting phase errors, while at the same time almost completely preventing passage of all energy at the horizontal synchronizing frequency. The circuit is also noteworthy in the use of high gain in the direct-current branch, the exact amount of this gain being dependent upon the design of the anti-hunt network.

The use of this invention provides a train of horizontal scanning synchronizing pulses which is independent of the magnitude of the incoming horizontal pulses and which is relatively unaffected by noise or by extra or omitted received horizontal pulses. The output horizontal scanning pulse train is completely unaffected by phase modulation effects of the normal vertical synchronizing signal block. The controls are completely independent, having no interaction upon each other, and permit an unusually wide latitude of horizontal picture phasing.

The general purpose then of this invention is to provide television receiver and monitor circuits for regenerating horizontal synchronization signals for use in triggering the horizontal scanning circuit.

More specifically, the purpose of this invention is to provide in a television receiver or video monitor an automatic horizontal synchronization frequency control circuit having optimum speed of response, independent controls and freedom from errors due to phase and noise disturbance.

Still more specifically, the purpose of this invention is to provide a horizontal synchronization circuit having non-interdependent controls for producing powerful horizontal pulses that are perfectly synchronized and phase-locked to incoming horizontal pulse signals while ignoring variations in pulse width and height as well as noise.

Figure 2:
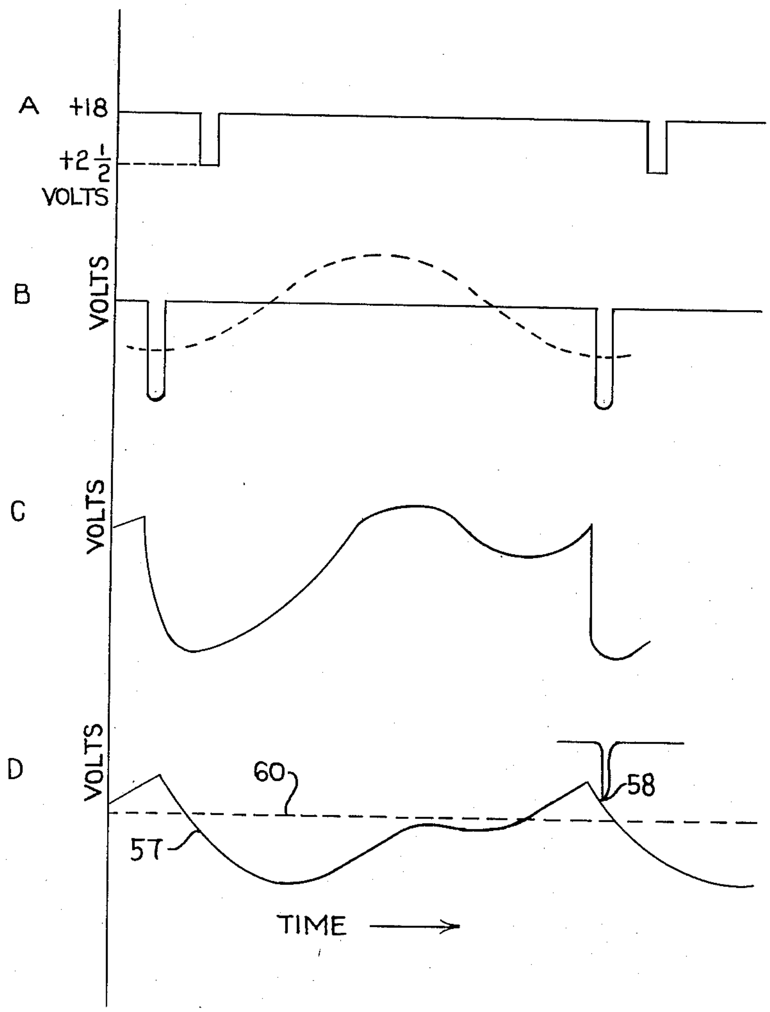

A further understanding of this invention may be secured by reference to the detailed description and the associated drawings, in which:

Figure 1 is a horizontal synchronizing pulse regenerating circuit embodying the invention. Figure 2 depicts waveforms at selected points in the circuit.

Referring now to Fig. 1, the synchronizing signal, including horizontal and vertical synchronizing pulse trains, is received at the input terminal 11 and is transmitted through a coupling condenser 12 to a duodiode phase comparison circuit comprising the two discharge tube diodes 13 and 14, although crystal diodes are also suitable for use if desired instead of tube diodes. The two cathodes 16 and 17 are tied together and connected to the input coupling condenser 12. The anode 18 of diode 13 is connected to the movable contact 19 of a voltage divider 21 which is connected through a resistor 22 between a source of positive potential of about 280 volts and ground. Resistance values are such that the range of the voltage divider 21 is from zero to +7 volts. The voltage divider 21 is termed the "hold" control. Its function is to control the phase of the regenerated horizontal synchronizing pulses with relation to the phase of the received horizontal pulses. This it does with great exactness through operation of the phase comparator circuit.

The anode 23 of diode 14 has the dual functions of serving as a direct-current output element as well as a means to introduce the feed-back signal. The direct-current output path is from the anode 23 through an isolating resistor 24 to a bridged T anti-hunt circuit comprising series resistor arms 26 and 27, bridging condenser 28 and shunt condenser 29. The output, which has a relatively high constant voltage content, is applied to the control grid 31 of a direct coupled triode amplifier 32. The direct-current content of this input therefore maintains the fixed bias of the grid 31 at a point representative of the phase comparator output, and the output of the amplifier 32 is representative of this bias and is controlled by it. The amplified and inverted output voltage of triode 32 is applied through a "coarse hold" bias-setting voltage divider comprising rheostat 33 to the control grid 34 of a triode 36. This triode together with transformer 37 comprises a free-running blocking oscillator.

The transformer 37 includes an anode coil 38 connected to the anode 39 of triode 36 and a grid coil 41 connected through a condenser 42 to the grid 34. A damper resistance 43 is connected across coil 38. Coils 38 and 41 are inductively coupled to each other and are also connected in series at junction 44, from which point the output is derived. The output is applied from junction 44 as a feedback to diode 14 through coil 46, resistor 47 and coupling condenser 48. The coil 46 is not coupled magnetically to the transformer coils and is shunted by a tuning condenser 49 of such size as to resonate at the horizontal pulse frequency of 15,750 C. P. S.

The operation of the circuit as so far described, including tubes 13, 14, 32 and 36, is as follows. The negative horizontal synchronizing pulses as received at input terminal 11 are shown in idealized form in Fig. 2 at A. Upon arrival of a negative horizontal pulse at the input terminal 11 the cathode 16 is made more negative than the anode 18 and the diode 13 is therefore made conductive during the occurrence of the pulse. Since in its conductive state the tube impedance is low, and because the anode potential is fixed by reason of its connection to the voltage divider 21, the cathode 16 assumes almost exactly the potential of the anode 18 at the pulse peak. If, for example the "hold" adjustment at contact 19 is set at +3 volts, the cathode 16 assumes approximately the same peak potential. This potential is also applied to the cathode 17 because of its direct connection to cathode 16. This potential of the cathodes 16 and 17 persists with only slight loss between pulses because the time constant of the circuit is on the order of 63 $\mu$s., the interval between pulses. The average pulse tip potential may be assumed to be +2½ volts and this value is indicated in graph A, Fig. 2.

The fed-back signal applied to anode 23 of diode 14 is derived as follows: The blocking oscillator comprising tube 36 is designed to oscillate at the horizontal pulse frequency of 15,750 C. P. S., initial adjustment of this frequency being made by adjustment of the voltage divider 33. The oscillator output at junction 44, considered alone, would have the form of the negative pulse B, Fig. 2. However, this pulse shock-excites the resonant circuit composed of coil 46 and condenser 49 which then superimposes a sine wave potential on the blocking oscillator output. This sine wave form is indicated by the dotted curve in Fig. 2B. The composite wave form is applied to junction 52, at which a positive potential also is applied through resistor 53 constituting the anode resistor for the anode 39 of triode 36. The resistor 53 in combination with the grounded condenser 54 constitutes a sawtooth generator, so that, after the junction 52 has been reduced in potential by the negative pulse B, Fig. 2, the potential recovery thereof depends upon the time constant of the resistor 53 and condenser 54. At the junction 52, therefore, a negative sawtooth wave form is added to the negative pulse and sine wave form, resulting in the combined wave form of C, Fig. 2. This wave form is integrated by the resistor 47 and condenser 56 to the wave form D, Fig. 2. It is this wave form which is applied to the anode 23 of diode 14. The phase is such that the downward slope 57 occurs during the time of imposition of the horizontal synchronizing pulse on the cathode 17. The energy content of the charge on the anode 23 is much less than that of the charge on cathode 17, and if before the occurrence of the horizontal pulse the anode 23 is more negative than the cathode 17, then upon the occurrence of the pulse the cathode becomes more negative and the diode becomes conductive. The anode potential then rises until at its intersection with the pulse it assumes the potential of the tip of the pulse. In graph D this condition is shown, with the tip 58 of the pulse coinciding with the integrated graph. If, however, the pulse tip should be more positive than the fed-back wave form, the diode 23 will not become conductive during the pulse, and the anode 23, by reason of the circuit established through resistors 59 and 51, will become more positive until it coincides with the tip of the pulse. The potential of the anode 23 at the instant of occurrence of the horizontal pulses is therefore made to coincide with the potential of the pulse negative peak, and the average potential of the anode 23 indicated at 60, Fig. 2, for a given wave form, is thus made proportional to the potential of the pulse peak and is also a direct function of the exact point on the slope 57 at which this slope coincides with the pulse. Obviously any relative time displacement of the pulse and the integrated wave form D will change their coincidental relation and the wave form will thereupon move up or down until the pulse tip is again coincident therewith.

The average potential of the anode 23 is thus very sensitive to the relative time phase of the fed-back wave form and of the received horizontal synchronizing pulse, and any change in the time of occurrence of either the pulse or the fed-back wave form will be followed by a corresponding change of the average direct-current potential 60 of the anode 23.

The potential of the anode 23 is also the potential of the junction 61, and is applied through resistor 24 and the bridged T network, where it is filtered and smoothed, to the control grid 31 of triode 32. The design of the bridged T network, although not critical, has an optimum value and it is important, in order to secure the full advantage of this invention, that this anti-hunt and filtering network be correctly designed for the amount of gain employed in amplifier 32. As one example of correct design, when a voltage gain of 20 db was employed in the stage of triode 32, the bridged T network consisted of series of resistors 26 and 27 having values of 33,000 and 27,000 ohms respectively, bridged by a 0.1 $\mu$f. condenser 28 and utilizing a 0.25 $\mu$f. shut arm condenser 29. The series input resistor 24 was given a value of 150,000 ohms and the shunt input resistor 62 a value of 470,000 ohms, while the output worked into an essentially infinite impedance, the average direct-current potential of control grid 31 being −0.35 volt. When the design of this anti-hunt circuit is suitable there is no possibility of horizontal picture jitter caused by hunting due to high loop gain. The output synchronizing pulse is tightly phase-locked to the input pulse, yet omission of input pulses or addition of extra input pulses do not noticeably affect the output pulse frequency because of the high degree of integration effected in the loop.

The direct current variation of the voltage at the control grid 31 of the triode 32 results in a representative variation of the potential at the anode 30, which latter potential is applied to the grid 34 of the blocking oscillator 36 through the adjustable series resistor 33. The natural frequency of the oscillator circuit is dependent in part on the direct current potential applied to its grid 34 and any variation in such potential results in a change in frequency of oscillator output. The circuit is so designed that change in grid potential as a result of phase comparison between the input synchronizing signals and the signal wave form D of Fig. 2 results in a change in the output frequency and phase of the oscillator into phase equality and therefore synchronism with the input synchronizing signals applied at terminal 11.

The output of the blocking oscillator is derived from the cathode 63 of the blocking oscillator tube 36 and is in the form of a narrow and powerful positive pulse. This pulse is applied to the control grid 64 of a sweep generating pentode 66. The sweep wave form is of the usual spiked trapezoidal type and is generated by the sawtooth generator consisting of resistors 67 and 68, width control rheostat 69 and condenser 71. The spiked trapezoidal scanning wave form is thus not generated in the timing oscillator 36, as is frequently the case, but in the separate tube 66, so that changes and adjustments of the magnitude and timing of the timing pulse have no effect upon the shape of the trapezoidal output, and conversely, adjustments and changes in the tube 66 and its associated circuit cannot affect the timing of the pulses.

The spiked trapezoidal wave form is applied through an output amplifier 72 to a horizontal pulse transformer 73 and damper tube 74 which are connected in a conventional circuit to a horizontal yoke coil 76 associated with a cathode ray picture tube 77. Centering of the picture is controlled by breaking the transformer yoke secondary winding into two parts 78 and 79, and applying an adjustable differential direct-current bias to them by means of the double voltage dividers 81 and 81'.

This centering control is independent of all other controls since it can have no effect upon the preceding tube 66. Similarly, the width control 69 can have no effect on either the centering control following it or on the preceding tube 36. In the same manner the coarse hold control 33 and the hold control 21 are completely independent of the other controls. In effect, the coarse hold control 33 affects the frequency of the blocking oscillator and the hold control 21 changes the phase of the blocking oscillator and of the raster relative to the incoming horizontal synchronizing signal phase.

What is claimed is:

1. A television horizontal synchronizing circuit comprising, a blocking oscillator having a normal frequency of operation producing a train of pulse signals at the frequency of operation thereof, means for reshaping said train of pulse signals producing therefrom a signal wave form, having in part a negative slope characteristic, phase comparison means having received horizontal synchronizing signals and said reshaped signal wave form impressed thereon and operated thereby to adjust the average level of said reshaped wave form so that the instantaneous value of the negative slope thereof is equal to the peak potential of a received horizontal synchronizing pulse, filter means for deriving a direct current potential from said reshaped wave form, the magnitude of which is proportional to the average value of said wave form, and means for adjusting the frequency of said blocking oscillator in accordance with the magnitude of said direct current potential.

2. A television horizontal synchronizing circuit comprising, a blocking oscillator having a normal frequency of operation producing a train of pulse signals at the frequency of operation thereof, means for reshaping said train of pulse signals producing therefrom a signal wave form having in part a negative slope characteristic, means for adjustably determining the peak magnitude of received horizontal synchronizing signals, means for adjusting the average level of said reshaped wave form to a value such that the instantaneous magnitude of the negative slope thereof at the time of occurrence of a horizontal synchronizing signal is equal to said adjustably determined peak magnitude, filter means having said reshaped wave form impressed thereon producing therefrom a direct current potential whose magnitude is proportional to the average value thereof, and means for controlling the normal frequency of said blocking oscillator in accordance with the magnitude of said direct current potential.

3. A television horizontal synchronizing circuit comprising, a blocking oscillator having a normal frequency of operation producing a train of pulse signals at the frequency of operation thereof, means for reshaping said train of pulse signals producing therefrom a signal wave form having in part a negative slope characteristic, a first diode having received horizontal synchronizing signals impressed on its cathode and its anode connected to a selected direct current potential, a second diode having its cathode directly connected to the cathode of said first diode and having said reshaped signal wave form impressed on its anode, and a filter circuit connected between the anode of said second diode and a control electrode of said blocking oscillator.

4. A television horizontal synchronizing circuit comprising, a blocking oscillator having a normal frequency of operation producing a train of pulse signals at the frequency of operation thereof, means operated by said train of pulse signals for generating a sine wave signal, means for generating a generally sawtooth signal from said train of pulse signals and said sine wave signal, means for integrating said sawtooth signal to provide a signal wave form a portion of which has a negative slope characteristic, phase comparison means having received horizontal synchronizing signals of selected peak amplitudes and said signal wave form impressed thereon and operated thereby to adjust the average level of said signal wave form to a value such that the instantaneous magnitude of said signal wave form is equal to the selected peak amplitude of a received horizontal synchronizing signal at the time of occurrence thereof, means for obtaining a direct current potential from said signal wave form the magnitude of which is dependent on the average magnitude of said signal wave form, and means for controlling the frequency of said blocking oscillator in accordance with the magnitude of said direct current potential.

5. A television horizontal synchronizing circuit comprising, a blocking oscillator producing a train of pulse signals at the frequency of operation thereof, means actuated by said train of pulse signals for generating a sine wave signal, means operated by the combination of said sine wave signal and said train of pulse signals for generating a sawtooth signal from said combined signals, means for integrating said sawtooth signal to provide a modified signal wave form a portion of which has a negative slope characteristic, a source of received horizontal synchronizing signals, means for selectively adjusting the peak magnitudes thereof, means operative by the adjusted peak magnitude horizontal synchronizing signals and said modified wave form for adjusting the average potential level of said modified wave form to a value such that the instantaneous amplitude of its negative slope portion of said modified signal wave form at the instant of occurrence of a horizontal synchronizing pulse is equal to the selectively adjusted peak magnitude thereof, means for deriving a direct current potential from said modified signal wave form the magnitude of which is dependent on the average potential thereof, and means for controlling the frequency of said blocking oscillator in accordance with the magnitude of said direct current potential.

6. A television horizontal synchronizing circuit comprising, a blocking oscillator producing a train of pulse signals at the frequency of operation thereof, means actuated by said train of pulse signals for generating a sine wave signal, means operated by the combined sine wave signal and said train of pulse signals for generating a sawtooth signal from said combined signals, means for integrating said sawtooth signal to provide a modified signal, a first diode having its cathode coupled to a source of received horizontal synchronizing signals, means for adjusting the anode potential thereof, a second diode having its cathode directly connected to the cathode of said first diode, an alternating current circuit impressing said modified signal on the anode of said second diode, and a direct current circuit including filter means connecting the anode of said second diode to a control electrode of said blocking oscillator.

References Cited in the file of this patent

UNITED STATES PATENTS

| | | |
|---|---|---|
| 2,585,929 | Gruen | Feb. 19, 1952 |
| 2,585,930 | Gruen | Feb. 19, 1952 |